United States Patent
Nathan et al.

(10) Patent No.: US 8,502,751 B2
(45) Date of Patent: Aug. 6, 2013

(54) PIXEL DRIVER CIRCUIT WITH LOAD-BALANCE IN CURRENT MIRROR CIRCUIT

(75) Inventors: Arokia Nathan, Waterloo (CA); Kapil V. Sakariya, Santa Clara, CA (US); Peyman Servati, Waterloo (CA); Shahin Jafarabadiashtiani, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 490 days.

(21) Appl. No.: 10/554,795

(22) PCT Filed: Sep. 23, 2004

(86) PCT No.: PCT/CA2004/001741
§ 371 (c)(1),
(2), (4) Date: Jun. 15, 2006

(87) PCT Pub. No.: WO2005/029455
PCT Pub. Date: Mar. 31, 2005

(65) Prior Publication Data
US 2007/0182671 A1    Aug. 9, 2007

(30) Foreign Application Priority Data
Sep. 23, 2003  (CA) ..................................... 2443206

(51) Int. Cl.
*G09G 3/30*    (2006.01)
(52) U.S. Cl.
USPC .................. 345/76; 345/82; 345/84; 313/484; 313/498
(58) Field of Classification Search
USPC ....... 345/76, 77, 36, 37, 45, 46; 313/484–498
See application file for complete search history.

(56) References Cited

U.S. PATENT DOCUMENTS

| 4,996,523 A | 2/1991 | Bell et al. |
| 5,266,515 A | 11/1993 | Robb et al. |

(Continued)

FOREIGN PATENT DOCUMENTS

| CA | 2249592 | 7/1998 |
| CA | 2368386 | 9/1999 |

(Continued)

OTHER PUBLICATIONS

Machine English translation of JP 2002-333862, 49 pages.

(Continued)

*Primary Examiner* — Amare Mengistu
*Assistant Examiner* — Vinh Lam
(74) *Attorney, Agent, or Firm* — Nixon Peabody LLP

(57) ABSTRACT

A pixel circuit for use in a display comprising a plurality of pixels is provided. The load-balanced current mirror pixel circuit can compensate for device degradation and/or mismatch, and changing environmental factors like temperature and mechanical strain. The pixel circuit comprises a pixel drive circuit comprising, switching circuitry, a current mirror having a reference transistor and a drive transistor, the reference transistor and the drive transistor each having a first and second node and a gate, the gate of the reference transistor being connected to the gate of the drive transistor; and a capacitor connected between the gate of the reference transistor and a ground potential, and a load connected between the current mirror and a ground potential, the load having a first load element and a second load element, the first load element being connected to the first node of the reference transistor and the second load element being connected to the first node of the drive transistor.

18 Claims, 15 Drawing Sheets

U.S. PATENT DOCUMENTS

| | | | |
|---|---|---|---|
| 5,498,880 A | 3/1996 | Lee et al. | |
| 5,619,033 A | 4/1997 | Weisfield | |
| 5,648,276 A | 7/1997 | Hara et al. | |
| 5,714,968 A | 2/1998 | Ikeda | |
| 5,748,160 A | 5/1998 | Shieh et al. | |
| 5,874,803 A | 2/1999 | Garbuzov et al. | |
| 5,880,582 A * | 3/1999 | Sawada | 323/315 |
| 5,903,248 A | 5/1999 | Irwin | |
| 5,917,280 A | 6/1999 | Burrows et al. | |
| 5,952,789 A | 9/1999 | Stewart et al. | |
| 5,990,629 A | 11/1999 | Yamada et al. | |
| 6,023,259 A | 2/2000 | Howard et al. | |
| 6,069,365 A | 5/2000 | Chow et al. | |
| 6,091,203 A | 7/2000 | Kawashima et al. | |
| 6,097,360 A | 8/2000 | Holloman | |
| 6,144,222 A | 11/2000 | Ho | |
| 6,229,508 B1 | 5/2001 | Kane | |
| 6,246,180 B1 | 6/2001 | Nishigaki | |
| 6,252,248 B1 | 6/2001 | Sano et al. | |
| 6,288,696 B1 | 9/2001 | Holloman | |
| 6,307,322 B1 | 10/2001 | Dawson et al. | |
| 6,323,631 B1 | 11/2001 | Juang | |
| 6,392,617 B1 | 5/2002 | Gleason | |
| 6,433,488 B1 | 8/2002 | Bu | |
| 6,501,466 B1 | 12/2002 | Yamagishi et al. | |
| 6,580,408 B1 | 6/2003 | Bae et al. | |
| 6,693,388 B2 * | 2/2004 | Oomura | 315/169.3 |
| 6,693,610 B2 | 2/2004 | Shannon et al. | |
| 6,697,057 B2 | 2/2004 | Koyama et al. | |
| 6,734,636 B2 | 5/2004 | Sanford et al. | |
| 6,859,193 B1 * | 2/2005 | Yumoto | 345/82 |
| 6,919,871 B2 | 7/2005 | Kwon | |
| 6,940,214 B1 | 9/2005 | Komiya et al. | |
| 7,129,914 B2 | 10/2006 | Knapp et al. | |
| 7,248,236 B2 | 7/2007 | Nathan et al. | |
| 7,310,092 B2 | 12/2007 | Imamura | |
| 7,474,285 B2 * | 1/2009 | Kimura | 345/77 |
| 2001/0002703 A1 | 6/2001 | Koyama | |
| 2001/0026257 A1 | 10/2001 | Kimura | |
| 2001/0030323 A1 | 10/2001 | Ikeda | |
| 2001/0043173 A1 | 11/2001 | Troutman | |
| 2001/0045929 A1 | 11/2001 | Prache | |
| 2001/0052606 A1 | 12/2001 | Sempel et al. | |
| 2002/0000576 A1 | 1/2002 | Inukai | |
| 2002/0011796 A1 | 1/2002 | Koyama | |
| 2002/0011799 A1 | 1/2002 | Kimura | |
| 2002/0180369 A1 | 12/2002 | Koyama | |
| 2002/0195968 A1 | 12/2002 | Sanford et al. | |
| 2003/0062524 A1 * | 4/2003 | Kimura | 257/72 |
| 2003/0090447 A1 * | 5/2003 | Kimura | 345/82 |
| 2003/0090481 A1 | 5/2003 | Kimura | |
| 2003/0107560 A1 * | 6/2003 | Yumoto et al. | 345/204 |
| 2003/0111966 A1 | 6/2003 | Mikami et al. | |
| 2003/0174152 A1 | 9/2003 | Noguchi | |
| 2003/0230980 A1 | 12/2003 | Forrest et al. | |
| 2004/0070557 A1 | 4/2004 | Asano et al. | |
| 2004/0145547 A1 | 7/2004 | Oh | |
| 2004/0150594 A1 * | 8/2004 | Koyama et al. | 345/82 |
| 2004/0150595 A1 | 8/2004 | Kasai | |
| 2004/0155841 A1 | 8/2004 | Kasai | |
| 2004/0196275 A1 | 10/2004 | Hattori | |
| 2004/0207615 A1 * | 10/2004 | Yumoto | 345/211 |
| 2004/0252089 A1 | 12/2004 | Ono et al. | |
| 2005/0007357 A1 | 1/2005 | Yamashita et al. | |
| 2005/0067971 A1 | 3/2005 | Kane | |
| 2005/0285825 A1 | 12/2005 | Eom et al. | |
| 2006/0027807 A1 | 2/2006 | Nathan et al. | |
| 2006/0261841 A1 | 11/2006 | Fish | |

FOREIGN PATENT DOCUMENTS

| | | |
|---|---|---|
| CA | 2242720 | 1/2000 |
| CA | 2354018 | 6/2000 |
| CA | 2 438 577 | 8/2002 |
| CA | 2436451 | 8/2002 |
| CA | 2463653 | 1/2004 |
| CN | 1381032 | 11/2002 |
| EP | 1 028 471 A | 8/2000 |
| EP | 1 130 565 A1 | 9/2001 |
| EP | 1 429 312 A | 6/2004 |
| EP | 1 465 143 A | 10/2004 |
| JP | 09 090405 | 4/1997 |
| JP | 11 231805 | 8/1999 |
| JP | 11282419 | 10/1999 |
| JP | 2000/056841 | 2/2000 |
| JP | 2002-333862 | 11/2002 |
| WO | WO 01/06484 | 1/2001 |
| WO | 02/067327 A | 8/2002 |
| WO | WO 02/067327 | 8/2002 |
| WO | WO 03/077231 | 9/2003 |
| WO | WO 2005/029455 | 3/2005 |
| WO | 2006/053424 | 5/2006 |

OTHER PUBLICATIONS

Ahnood et al.: "Effect of threshold voltage instability on field effect mobility in thin film transistors deduced from constant current measurements"; dated Aug. 2009 (3 pages).

Alexander et al.: "Pixel circuits and drive schemes for glass and elastic AMOLED displays"; dated Jul. 2005 (9 pages).

Alexander et al.: "Unique Electrical Measurement Technology for Compensation, Inspection, and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "A Stable Voltage-Programmed Pixel Circuit for a-Si:H AMOLED Displays"; dated Dec. 2006 (12 pages).

Chaji et al.: "A Sub-μA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated May 2003 (4 pages).

Chaji et al.: "Fast and Offset-Leakage Insensitive Current-Mode Line Driver for Active Matrix Displays and Sensors"; dated Feb. 2009 (8 pages).

Chaji et al.: "High Speed Low Power Adder Design With a New Logic Style: Pseudo Dynamic Logic (SDL)"; dated Oct. 2001 (4 pages).

Chaji et al.: "High-precision, fast current source for large-area current-programmed a-Si flat panels"; dated Sep. 2006 (4 pages).

Chaji et al.: "Low-Cost AMOLED Television with IGNIS Compensating Technology"; dated May 2008 (4 pages).

Chaji et al.: "Low-Cost Stable a-Si:H AMOLED Display for Portable Applications"; dated Jun. 2006 (4 pages).

Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report for European Application No. EP 04 78 6661 dated Mar. 9, 2009.
International Search Report for International Application No. PCT/CA2004/001741 dated Feb. 21, 2005.
Jafarabadiashtiani et al.: "A New Driving Method for a-Si AMOLED Displays Based on Voltage Feedback"; dated 2005 (4 pages).
Lee et al.: "Ambipolar Thin-Film Transistors Fabricated by PECVD Nanocrystalline Silicon"; dated 2006 (6 pages).
Ma e y et al: "Organic Light-Emitting Diode/Thin Film Transistor Integration for foldable Displays" Conference record of the 1997 International display research conference and international workshops on LCD technology and emissive technology. Toronto, Sep. 15-19, 1997 (6 pages).
Matsueda y et al.: "35.1: 2.5-in. AMOLED with Integrated 6-bit Gamma Compensated Digital Data Driver"; dated May 2004.
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).

Nathan et al.: "Driving schemes for a-Si and LTPS AMOLED displays"; dated Dec. 2005 (11 pages).
Nathan et al.: "Invited Paper: a -Si for AMOLED—Meeting the Performance and Cost Demands of Display Applications (Cell Phone to HDTV)"; dated 2006 (4 pages).
Nathan et al.: "Thin film imaging technology on glass and plastic"; dated Oct. 31-Nov. 2, 2000 (4 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Stewart M. et al., "Polysilicon TFT technology for active matrix OLED displays" IEEE transactions on electron devices, vol. 48, No. 5 (7 pages), May 5, 2001.
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).

* cited by examiner

PIXEL DRIVER CIRCUIT WITH LOAD-BALANCE IN CURRENT MIRROR CIRCUIT

FIELD OF INVENTION

The present invention relates to circuitry for use in an active matrix display, and more particularly to a current drive circuitry used to drive the electro-luminescent elements.

BACKGROUND OF THE INVENTION

OLED based displays have gained significant interest recently for many display applications because of their faster response times, larger viewing angles, higher contrast, lighter weight, lower power, and amenability to flexible substrates, as compared to liquid crystal displays (LCDs).

The simplest way of addressing an OLED display is to use a passive matrix format. Although passive matrix addressed OLED displays are already in the marketplace, they do not support the resolution needed for next generation displays, which use high information content (HIC) formats. HIC formats are only possible with an active matrix addressing scheme.

Active matrix addressing involves a layer of backplane electronics, based on thin-film transistors (TFTs). These thin film transistors provide the bias voltage and drive current needed in each OLED pixel and may be fabricated using amorphous silicon (a-Si:H), polycrystalline silicon (poly-Si), organic, polymer, or other transistor technologies. When compared to passive matrix addressing, active matrix addressing uses a lower voltage on each pixel and the current throughout the entire frame period is a low constant value. Thus, active matrix addressing avoids the excessive peak driving and leakage currents associated with passive matrix addressing. This increases the lifetime of the OLED.

LCDs are electric field driven devices. OLEDs, on the other hand, are current driven devices. Thus, the brightness and stability of the light emitted by a given OLED used in a display is dependent on the operation of the TFTs in the current drive circuit. Thus AMOLED displays are far more sensitive to TFT instabilities including, spatial and temporal variations in transistor threshold voltage, mobility instability, and mismatch issues. These instabilities need to be addressed for widespread use of OLED based displays.

FIG. 1 presents a graph of threshold voltage 'shift vs. stress voltage for various times for amorphous silicon based TFTs. It is readily apparent from FIG. 1 that the threshold voltage of the transistors varies over time. If these transistors were used in a display, the variation in threshold voltage would likely result in variation in the brightness of the OLED across the array and/or a decrease in brightness over time, both of which are unacceptable.

A simple pixel driver circuit is shown in FIG. 2. This "2T" circuit is a voltage programmed circuit. Such a circuit is not practical for OLED displays as such a circuit can not compensate for variations in transistor threshold voltage. One solution to this variation in threshold voltage is to use a current programmed circuit to drive the OLED of the pixels. Current programming is a good method for driving AMOLED displays since the OLED is a current driven device, and its brightness is approximately linearly dependent upon the current flowing through it.

One such current programmed circuit is presented in FIG. 3. This circuit incorporates a current-mirror which compensates for any shift or mismatch in the threshold voltage of the drive transistor T4 which ensures that the brightness of the OLED does not decrease over time. This feature of the circuit allows its drive characteristics to be much improved as compared to the 2T circuit of FIG. 2.

When programming the circuit of FIG. 3, $V_{ADDRESS}$ is high and a current $I_{DATA}$ is applied. This current initially flows through transistor T1 and charges capacitor $C_S$. As the capacitor voltage rises, T3 begins to turn on and $I_{DATA}$ starts to flow through T2 and T3 to ground. The capacitor voltage stabilizes at the point when all of $I_{DATA}$ flows through T2 and T3, and none through T1. This process is independent of the threshold voltage $V_T$ of transistors T3 and T4.

The gates of T3 and T4 are connected, so the current flowing through T3 is mirrored in T4. This topology allows us to have on-pixel current gain or attenuation depending on the sizing of T3 and T4, so that the respective data current can be proportionately smaller or larger than the OLED current. In an active matrix array, pixels are scanned and programmed in a row-by-row fashion. The time taken to scan all rows (one frame) is called the frame time. During array operation, the switching TFTs (T1 and T2) are ON only once in the frame time.

However, existing current programmed circuits do not adequately address long-term stability in the OLED drive current due to differential Vt-shift and other bias, temperature, or mechanical stress related degradations and mismatches in the current mirror.

SUMMARY OF THE INVENTION

The present invention relates to a circuit for driving light emitting elements in a display and more particularly relates to a current drive circuit that implements a current mirror wherein each transistor of the current mirror is connected to a load.

It is an object of the invention to provide improved AMOLED Display Backplanes and Pixel Driver Circuits.

Accordingly, it is an object of the present invention to provide pixel current driver circuits for active matrix organic light emitting displays (AMOLED), capable of providing stable and predictable drive currents, in the presence of device degradation and/or mismatch, and changing environmental factors like temperature and mechanical strain. The latter is particularly important for mechanically flexible AMOLED displays.

According to an aspect of the invention a pixel circuit for use in a display comprising a plurality of pixels is provided. The pixel circuit comprises a pixel drive circuit comprising, switching circuitry, a current mirror having a reference transistor and a drive transistor, the reference transistor and the drive transistor each having a first and second node and a gate, the gate of the reference transistor being connected to the gate of the drive transistor; and a capacitor connected between the gate of the reference transistor and a ground potential, and a load connected between the current mirror and a ground potential, the load having a first load element and a second load element, the first load element being connected to the first node of the reference transistor and the second load element being connected to the first node of the drive transistor.

According to another aspect of the invention a pixel circuit for use in a display comprising a plurality of pixels is provided. The pixel circuit comprises a pixel drive s circuit comprising, switching circuitry, a current mirror having a reference transistor and a drive transistor, the reference transistor and the drive transistor each having a first and second node and a gate, the gate of the reference transistor being connected to the gate of the drive transistor, the second node of the reference and drive transistors connected to a ground potential, and a capacitor connected between the gate of the reference transistor and a ground potential, and a load connected between the current mirror and a potential.

This summary of the invention does not necessarily describe all features of the invention.

BRIEF DESCRIPTION OF THE DRAWINGS

These and other features of the invention will become more apparent from the following description in which reference is made to the appended drawings wherein.

The above objects and features of the present invention will become more apparent by the following description of the preferred embodiments with reference to the attached drawings.

DETAILED DESCRIPTION

It has been found that the long-term stability of the OLED drive current can be addressed by providing a load to each transistor of the current mirror of a current based drive circuit.

Figure 1:
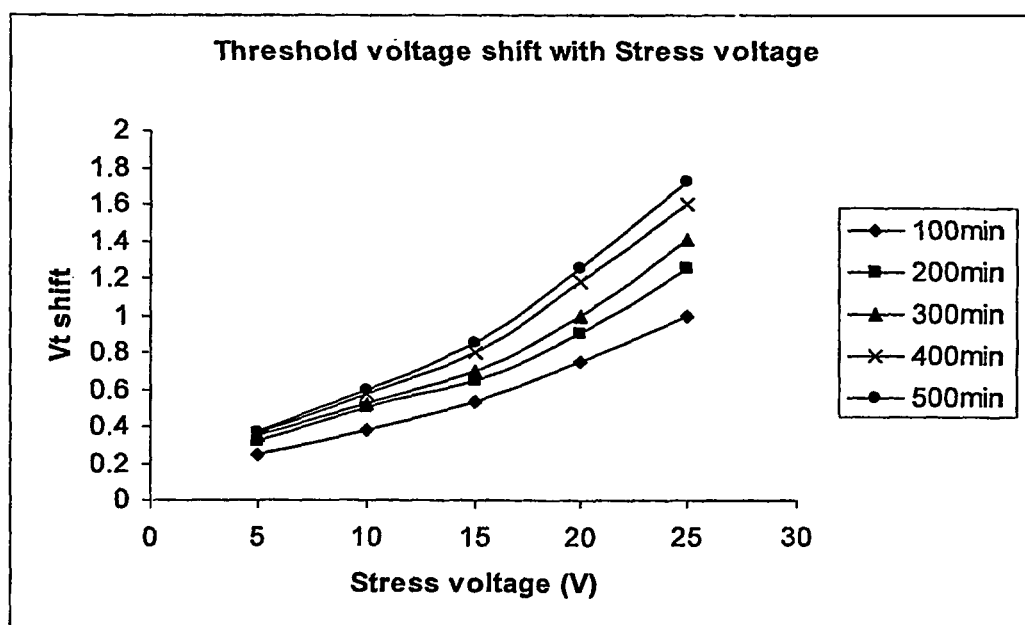
FIG. 1 shows a graph of threshold voltage shift v. gate stress voltage for various times for thin film transistors made from amorphous silicon.
Figure 2:
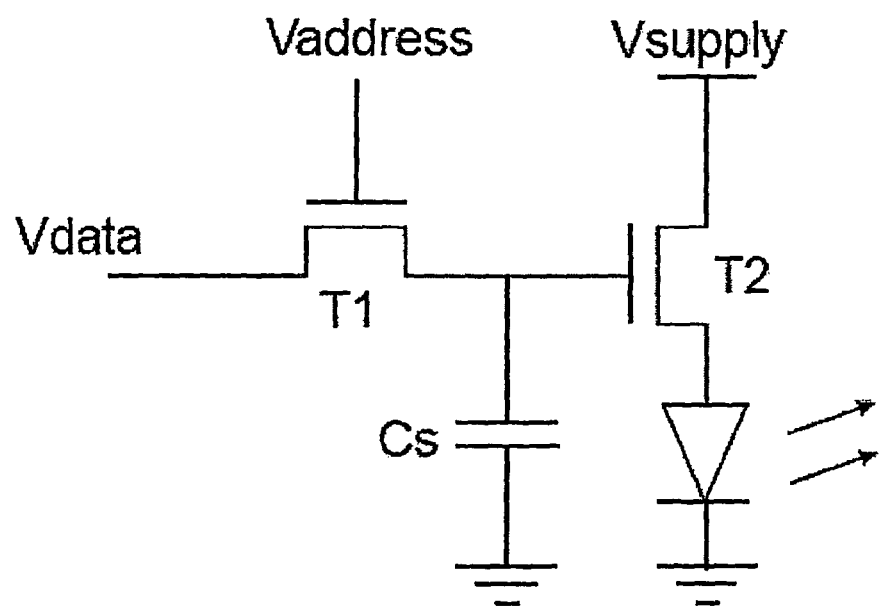
FIG. 2 shows a schematic diagram of a 2T voltage-programmed pixel driver circuit.
Figure 3:
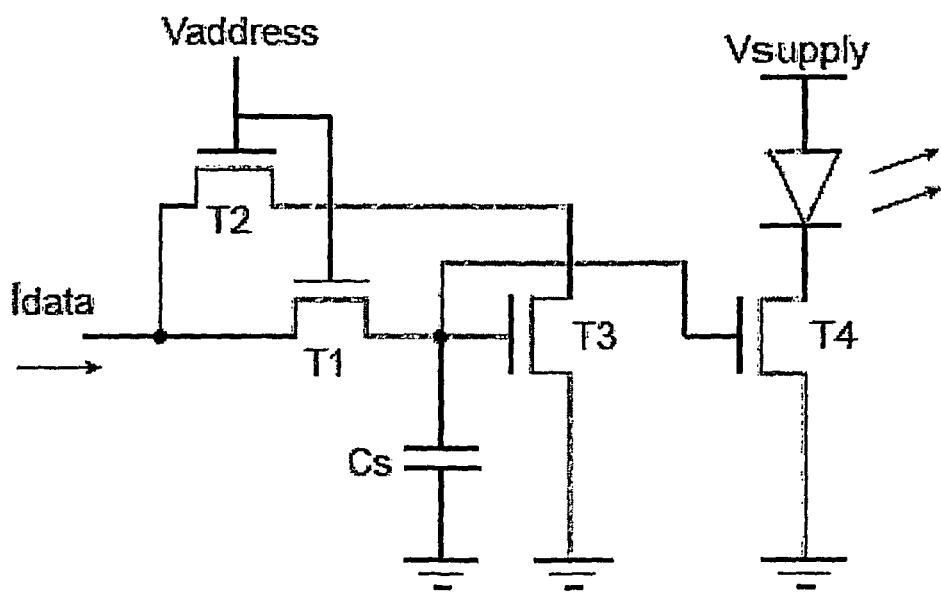
FIG. 3 shows a schematic diagram of a 4T current-programmed driver circuit.
Figure 4:
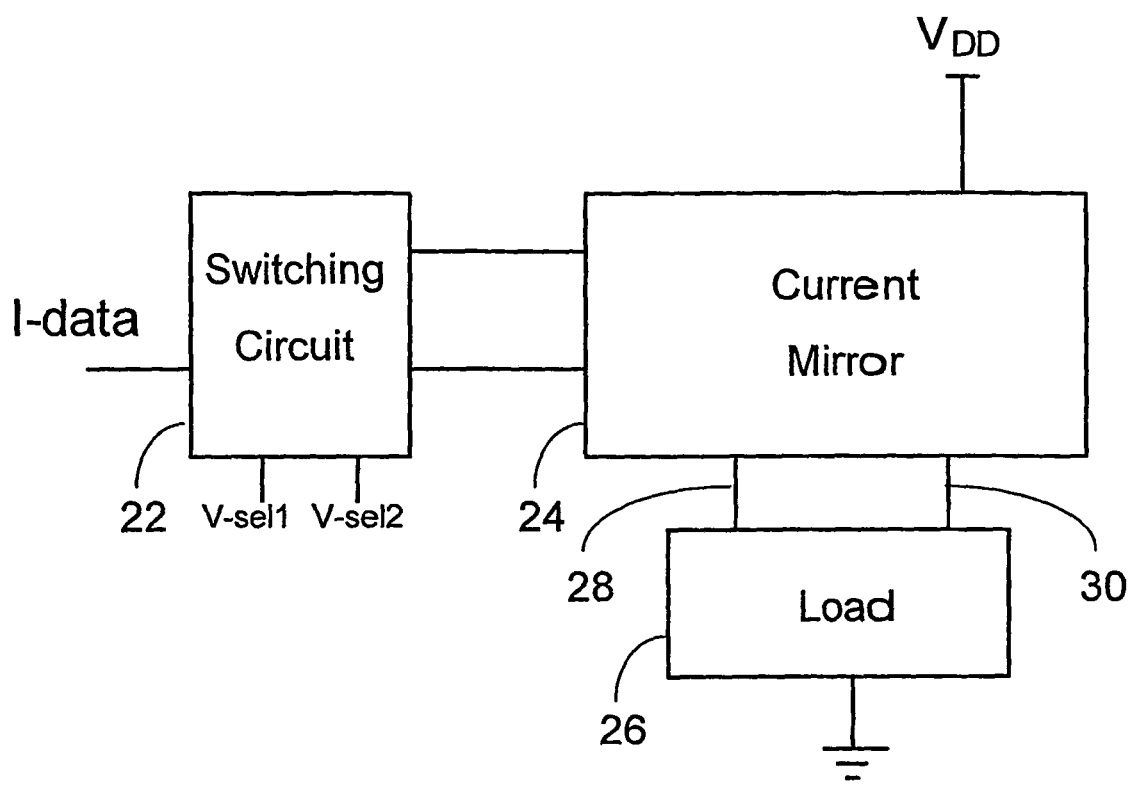
FIG. 4 shows a block diagram of a current-programmed driver circuit according to an embodiment of the invention.

A block diagram of a pixel driver circuit according to one aspect of the invention is shown in FIG. 4. The driver circuit can generally be considered to include a switching circuit 22, a current mirror 24 and a load 26. Of particular note is that the load 26 is configured, with respect to the current mirror 24, such that the two transistors of the current mirror 24 have a load connected to them. In the configuration shown in FIG. 4 the load 26 is connected between the current mirror 24 and ground with connections 28 and 30. Where the connections 28 and 30 are each connected to a node of a transistor of the current mirror and the load 26. This architecture provides for a balancing of the load between the transistors of the current mirror. Embodiments of the invention that implement this architecture will now be presented.

In the embodiment presented in FIG. 4 the switching circuit 22 is connected to two select lines, namely V-sel1 and V-sel2. The embodiments presented in FIGS. 5A-5C, 6A-6C and 7A-7E likewise have two select lines. The switching circuit 22 is further connected to a single data line, I-data.

Figure 5A:
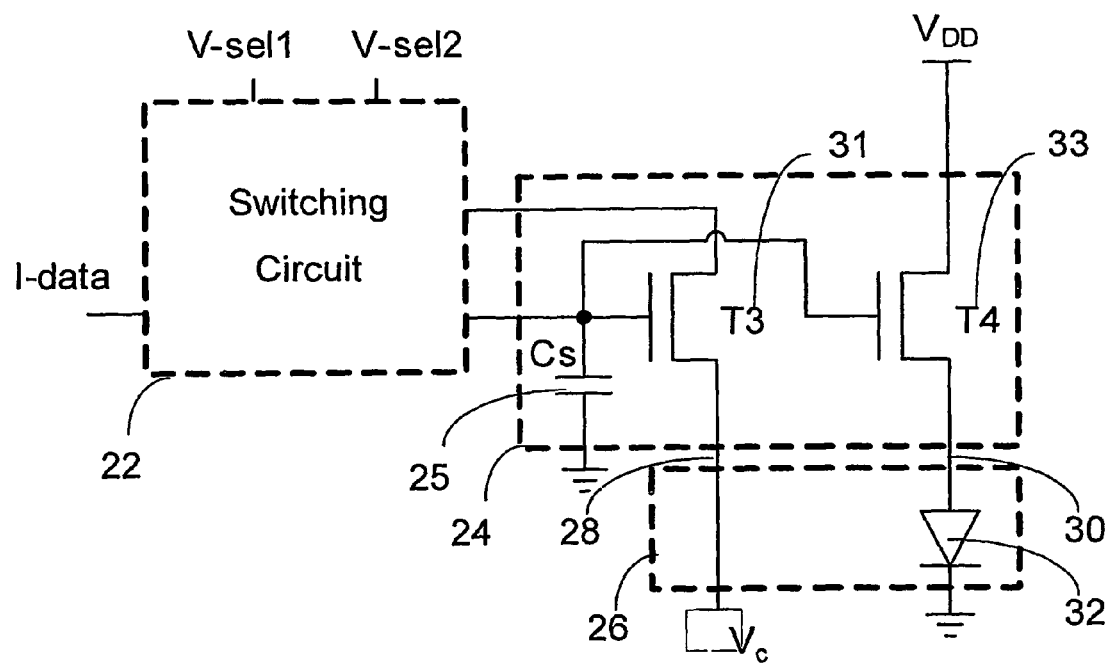
FIG. 5A shows a schematic diagram of a current-programmed driver circuit according to an embodiment of the invention.
Figure 5B:
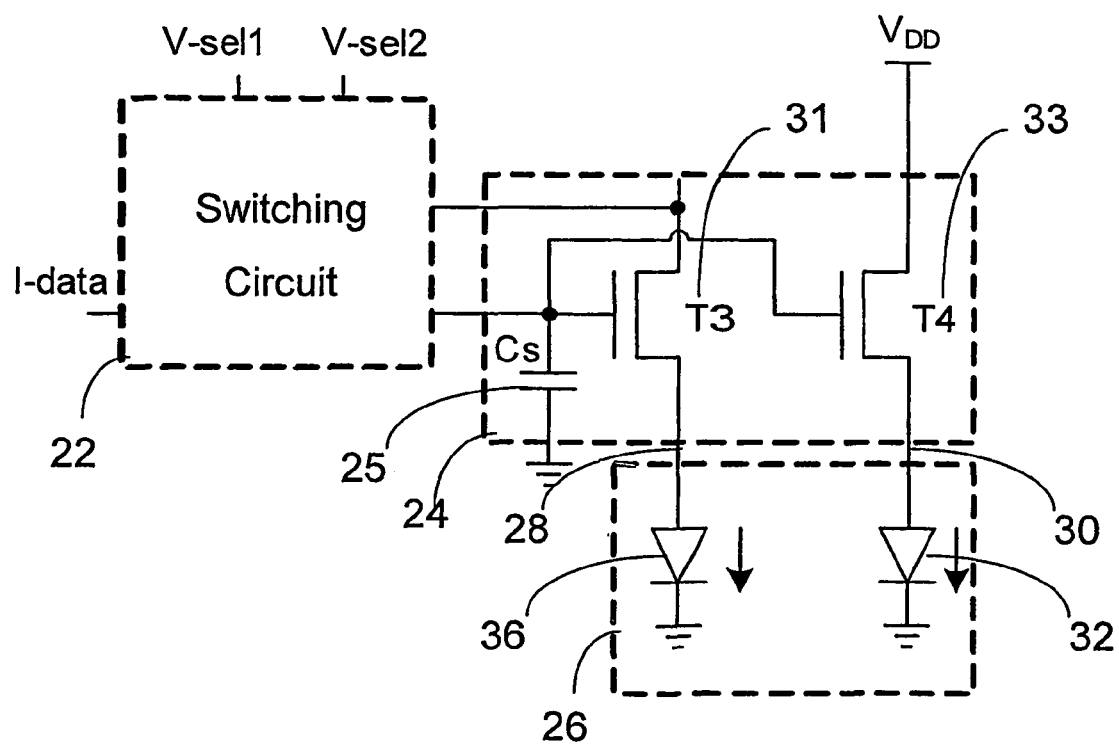
FIG. 5B shows a schematic diagram of a current-programmed driver circuit according to an embodiment of the invention.
Figure 5C:
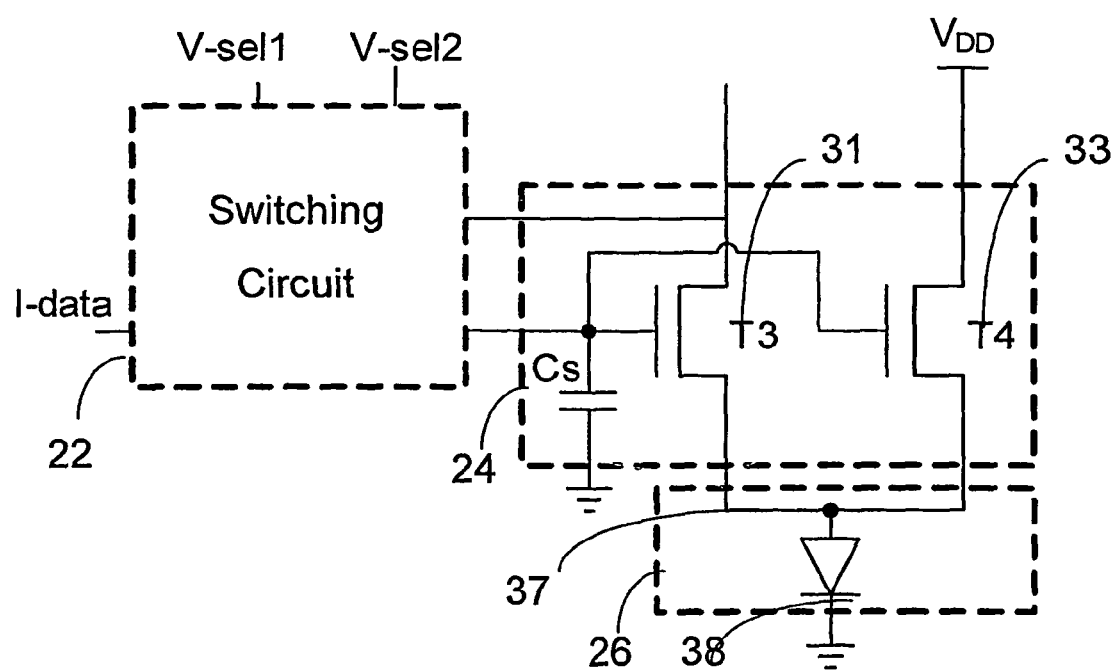
FIG. 5C shows a schematic diagram of a current-programmed driver circuit according to an embodiment of the invention.

The circuits presented in FIGS. 5A to 5C have the same basic architecture as the circuit presented in FIG. 4, i.e. both transistors of the current mirror are connected to the load 26. The circuits of FIGS. 5A to 5C present type and configuration variations for the load 26.

In FIG. 5A the current mirror 24 includes a reference transistor 31, a drive transistor 33. The transistors 31 and 33 are thin film transistors which have an amorphous silicon channel. A storage capacitor 25 is included in the current mirror 24. The gates of the transistor 31 and the transistor 33 are tied together and both connected to a plate of the storage capacitor 25. The other plate of the storage capacitor Cs is connected to ground. The source of the reference transistor 31 is connected to potential Vc and the drain is connected to the switching circuit 22. Connecting the source to the potential Vc allows the two sides of the current mirror to be balanced with proper biasing. The source of the drive transistor 33 is connected to a light emitting diode 32 and the drain is connected to $V_{DD}$. In this embodiment the light emitting diode 32 is an organic light emitting diode (OLED).

FIG. 5B is a schematic diagram of a pixel driver circuit according to another embodiment of the invention. In this embodiment the source of the reference transistor 31 and the drive transistor 33 are connected to light emitting diodes 36 and 32, respectively.

FIG. 5C presents the currently preferred configuration for the load 26. The transistors 31 and 33 are tied together using a connection 37. In FIG. 5C the connection 37 is pictorially located within the load 26. The current embodiment is not limited by this representation. A single OLED 37 is connected to the common connection 37.

Figure 6A:
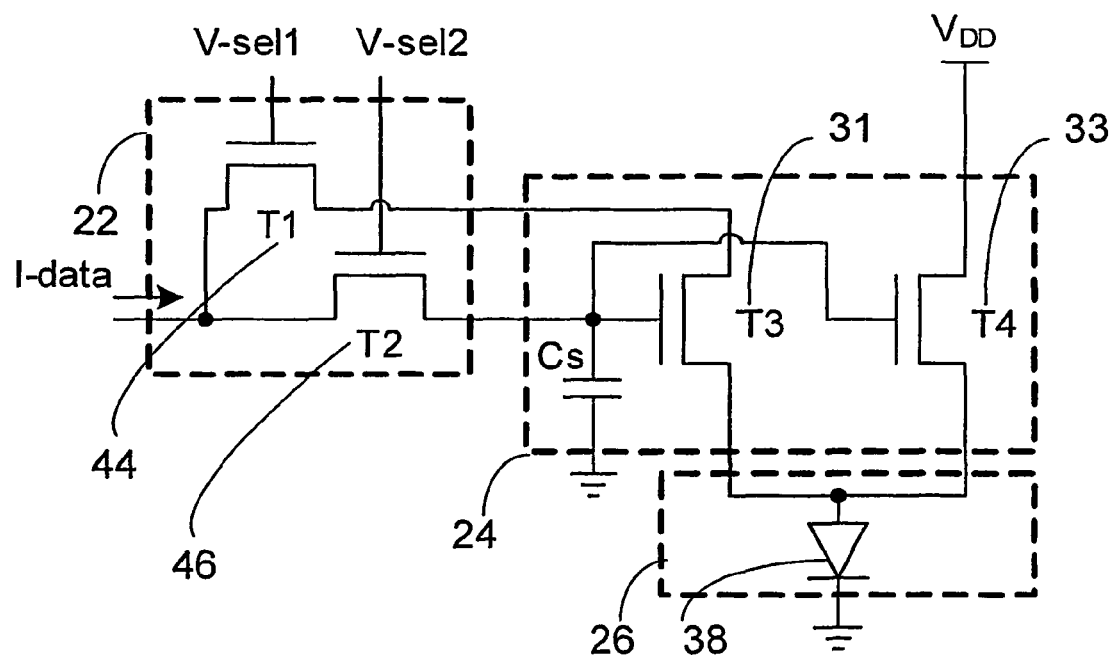
FIG. 6A shows a schematic diagram of a current-programmed driver circuit according to an embodiment of the invention.
Figure 6B:
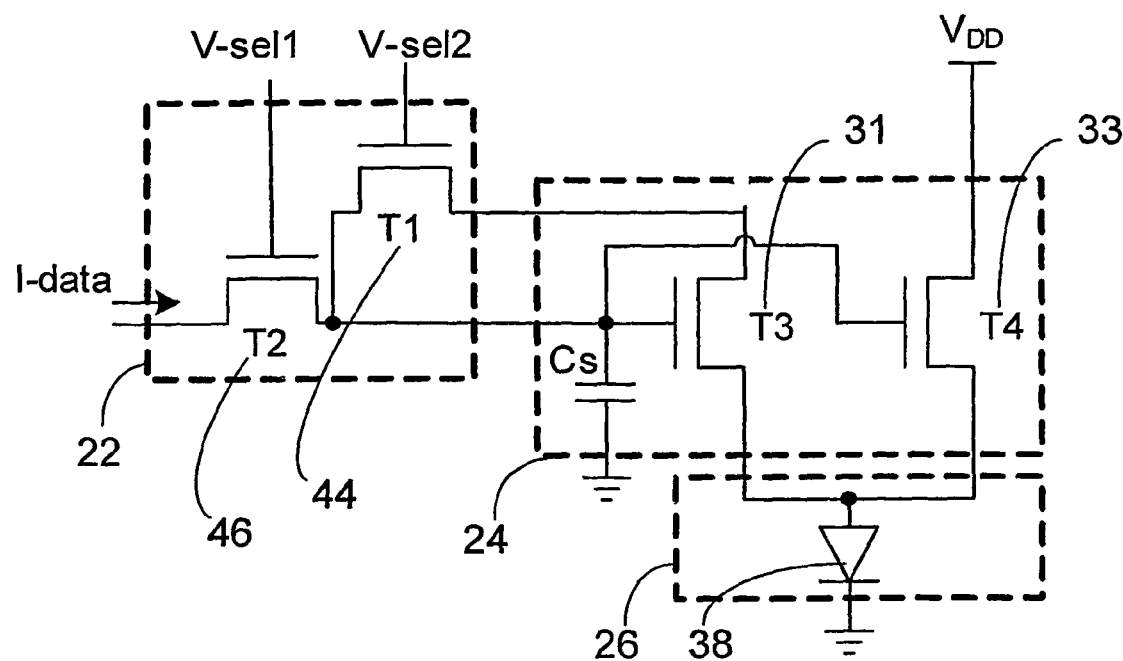
FIG. 6B shows a schematic diagram of a current-programmed driver circuit according to an embodiment of the invention.
Figure 6C:
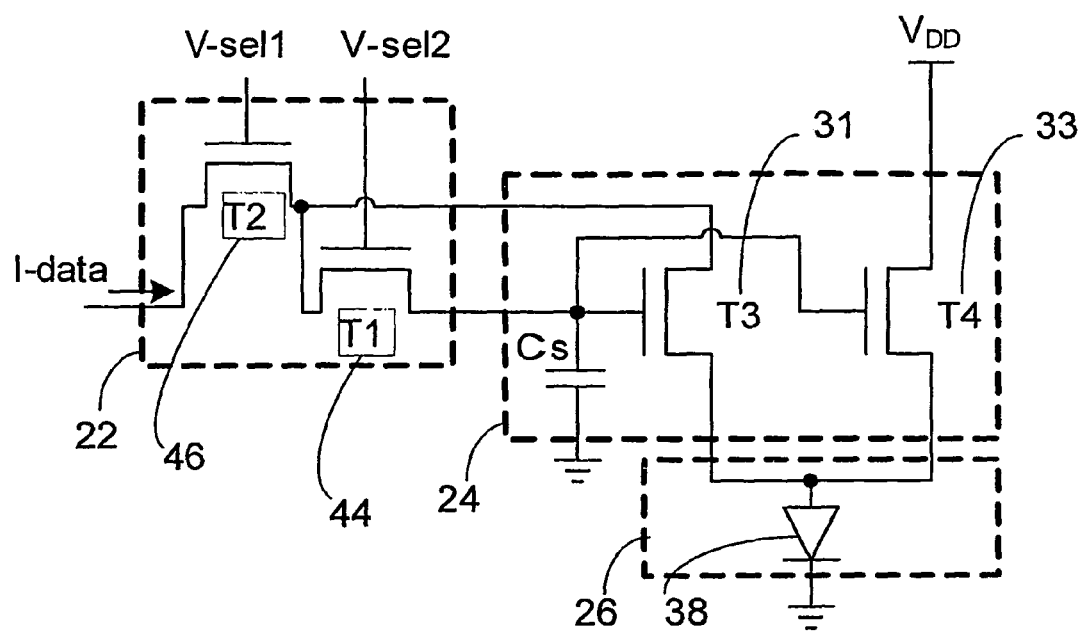
FIG. 6C shows a schematic diagram of a current-programmed driver circuit according to an embodiment of the invention.

FIGS. 6A to 6C present embodiments of the invention wherein the current mirror 24 and the load 26 are the same as the embodiment presented in FIG. 5C while various configurations of the switching circuitry are provided. The switching circuits presented in FIGS. 6A to 6C each have a feedback transistor 44 and a switch transistor 46.

In the circuit presented in FIG. 6A one terminal of the feedback transistor 44 and one terminal of the switch transistor 46 are connected to data line I-data. The second terminal of the feedback transistor 44 is connected to the drain of reference transistor 31 while the second terminal of the switch transistor 46 is connected to the gate of the reference and drive transistors 31 and 33, respectively. Finally, the gate of the feedback transistor 44 and switch transistor 46 is connected to the select line V-sel1 and select line V-sel2, respectively.

In the embodiment presented in FIG. 6B the first terminal of the switch transistor 46 is connected to the data line I-data while the first terminal of the feedback transistor 44 is connected to the second terminal of the switch transistor 46 which is connected to the gate of the reference and drive transistors 31 and 33, respectively. The second terminal of the feedback transistor 44 is connected to the drain of the reference transistor 31. Finally, the gate of the feedback transistor 44 and switch transistor 46 is connected to the select line V-sel2 and select line V-sel1, respectively.

In the embodiment presented in FIG. 6C the first terminal of the switch transistor 46 is connected to the data line I-data while the first terminal of the feedback transistor 44 is connected to the second terminal of the switch transistor 46 which is connected to the drain of the reference transistor 31. The second terminal of the feedback transistor 44 is connected to the gate of the reference and drive transistors 31 and 33, respectively. Finally, the gate of the switch transistor 46 and feedback transistor 44 is connected to the select line V-sel1 and select line V-sel2, respectively.

The circuits that have been considered are embodiments of the circuit presented as a block diagram in FIG. 4. An alternative embodiment of the circuit architecture of FIG. 4 is presented in FIG. 7A. The organization of the switching circuit 22 and the current mirror 24 is the same as the embodiment presented in FIG. 4. In this embodiment the load 26 is arranged such that it is between the potential $V_{DD}$ and the current mirror 24. FIG. 7B-7E present embodiments of the invention based on the block diagram of FIG. 7A. These embodiments implement the same circuit for the current mirror 24 while the configuration of, the load 26 varies.

Figure 7A:
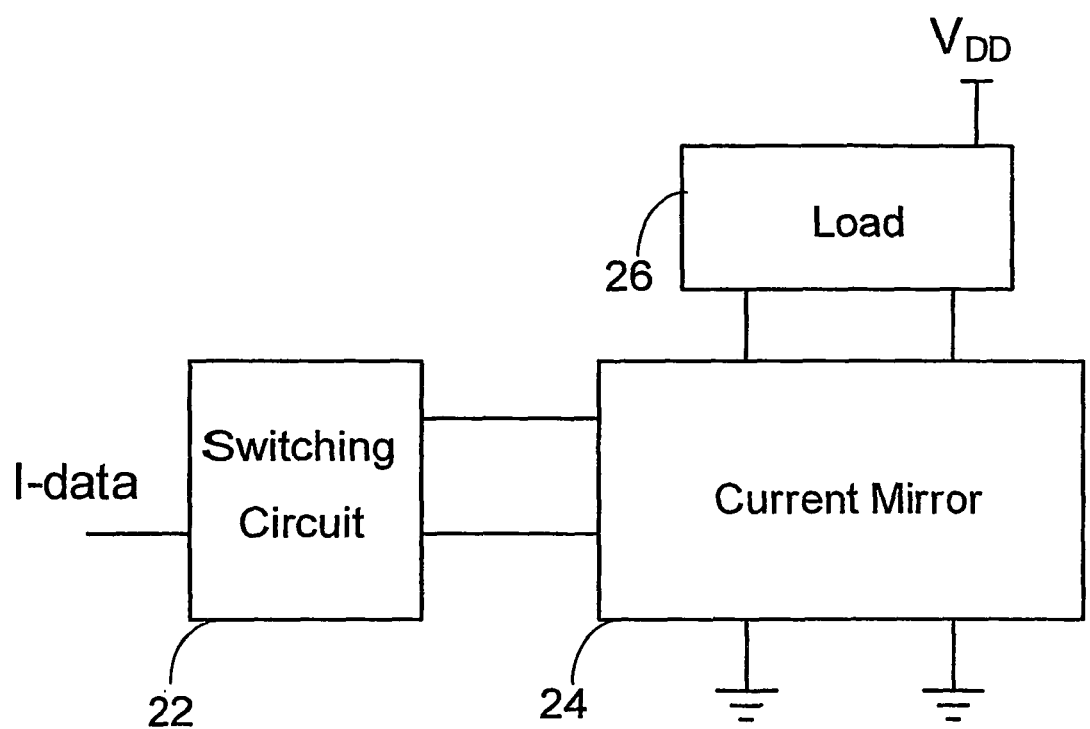
FIG. 7A shows a block diagram of a current-programmed driver circuit according to an embodiment of the invention.
Figure 7B:
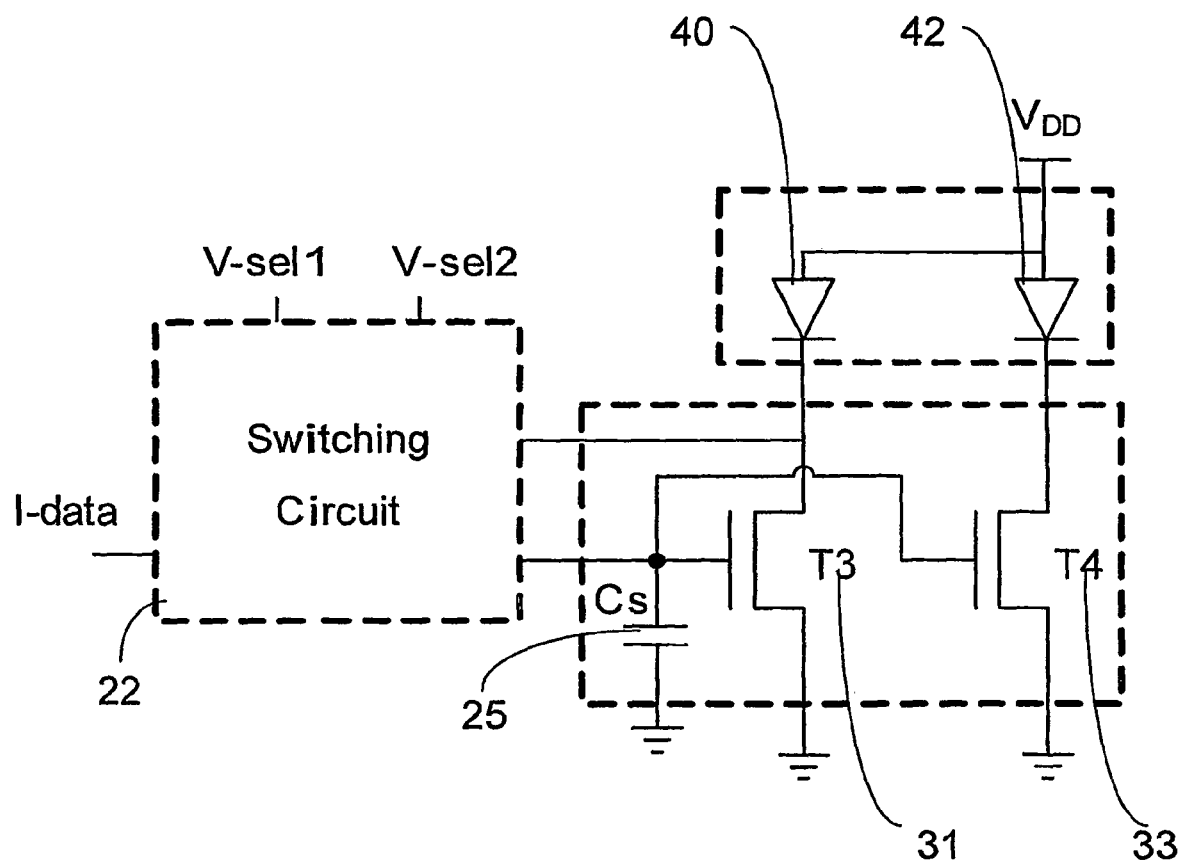
FIG. 7B shows a schematic diagram of a current-programmed driver circuit according to an embodiment of the invention.

In the embodiment presented in FIG. 7B the load 26 includes light emitting diodes 40 and 42. The diodes 40 and 42 are connected between the potential $V_{DD}$ and the drain of reference transistor 31 and drive transistor 33, respectively. The sources of the reference transistor 31 and the drive transistor 33 are connected to ground. The gates of the reference transistor 31 and the drive transistor 33 are tied together and connected to both the switching circuit 22 and a plate of the storage capacitor 25. In the embodiment presented in FIG. 7C the light emitting diode 40 is connected to a potential $V_c$ and the diode 42 is connected to the potential $V_{DD}$. The embodiments presented in FIGS. 7D and 7E differ from the embodiments of FIGS. 7B and 7C, respectively, in that the light emitting diode 40 is replaced with a transistor 47. The gate of transistor 47 is connected to a third select line V-sel3, a first terminal is connected to a potential and a second terminal is connected to the source terminal of reference transistor 31.

Figure 7C:
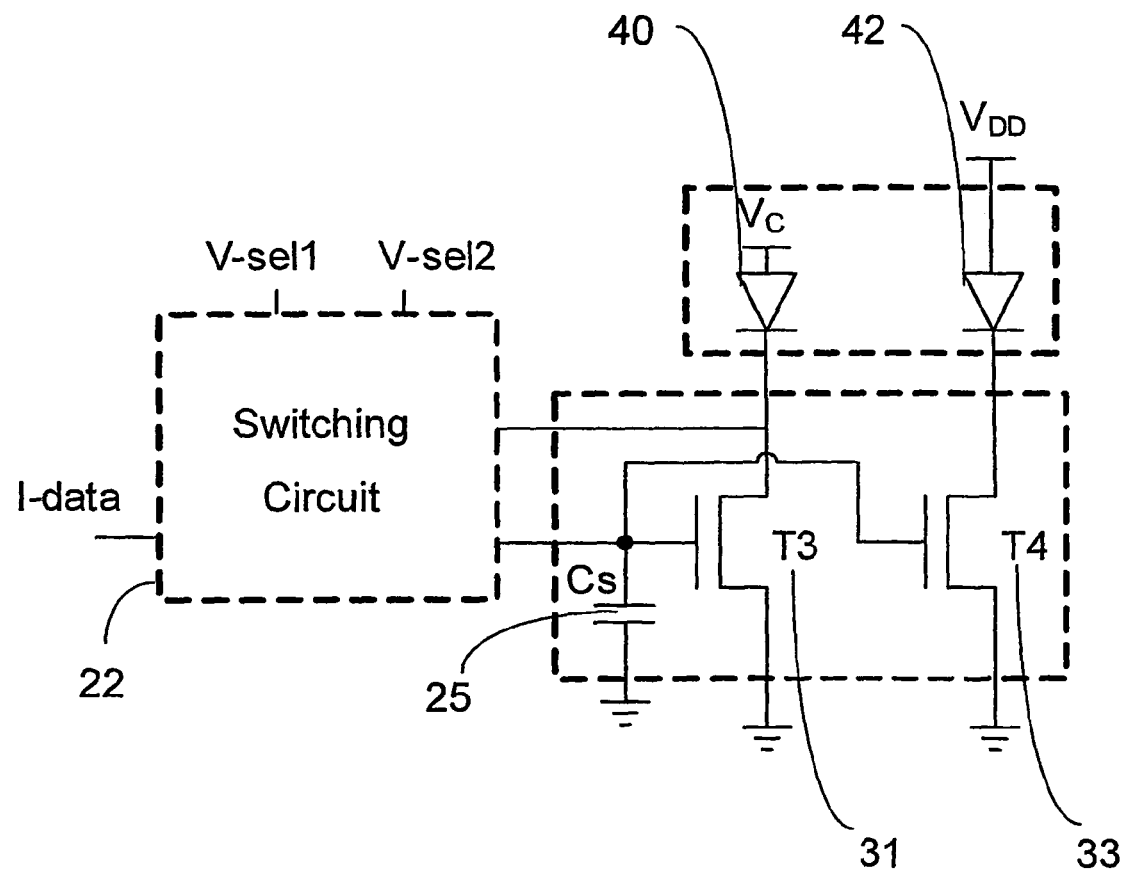
FIG. 7C shows a schematic diagram of a current-programmed driver circuit according to an embodiment of the invention.
Figure 7D:
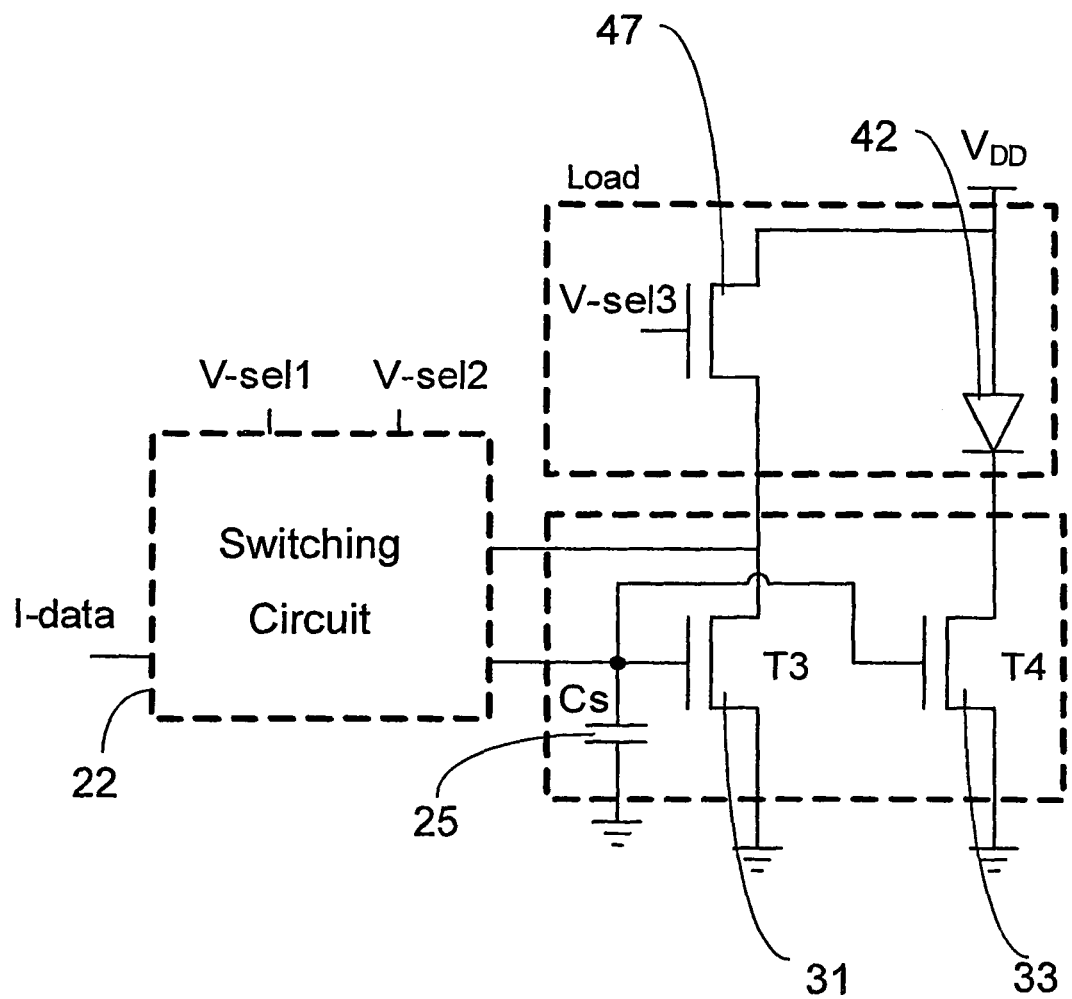
FIG. 7D shows a schematic diagram of a current-programmed driver circuit according to an embodiment of the invention.
Figure 7E:
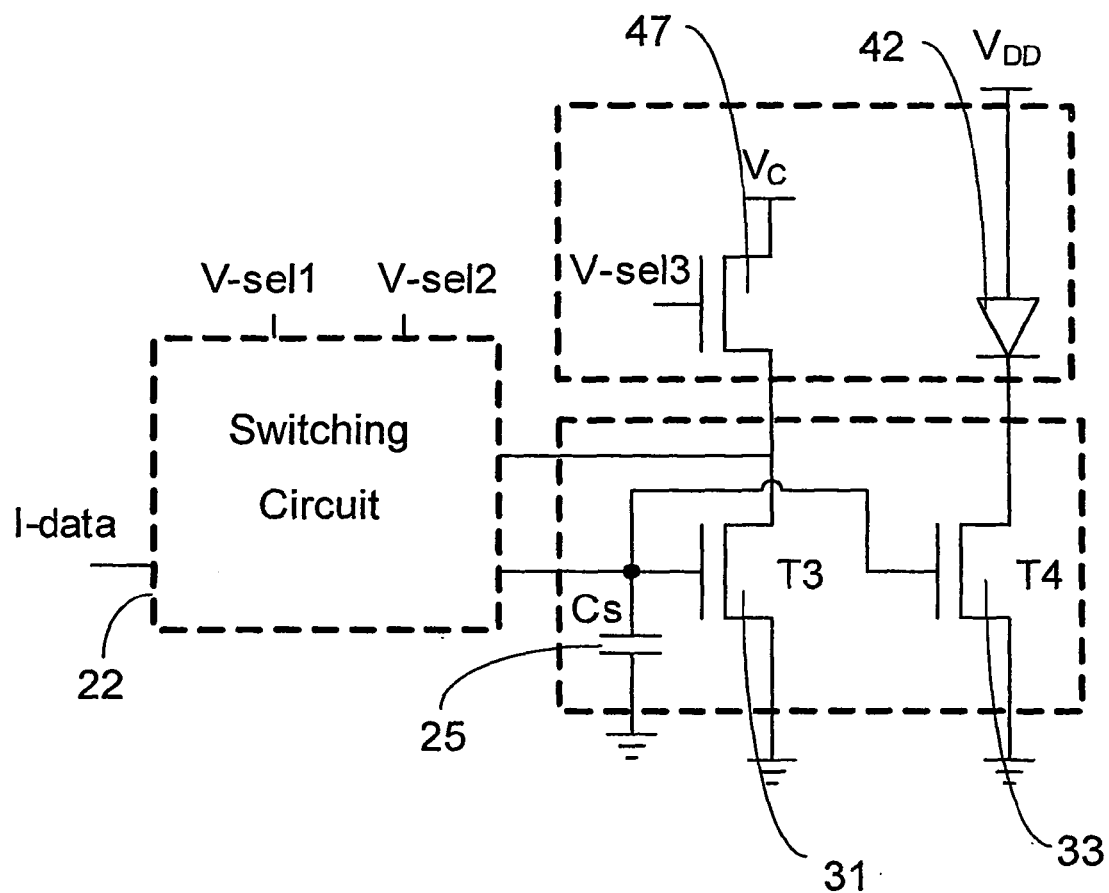
FIG. 7E shows a schematic diagram of a current-programmed driver circuit according to an embodiment of the invention.

In the schematic diagram of FIGS. 5B, 7B, and 7C there are two OLEDs in each pixel. Such a double OLED structure is formed by partitioning the bottom electrode of the OLED of each pixel into two electrodes. Partitioning of the electrode provide for the formation of two OLEDs in each pixel. One of the OLEDs is connected to the drive transistor and the other is connected to the reference transistor. Therefore the load of reference and drive transistors is the same, resulting in a minimization of mismatches between these two transistors. It is noted that the ratio between the areas of the two OLEDs and the gain of the current mirror can be engineered to achieve desired circuit performance.

According to an alternative embodiment of the invention the transistors can be any appropriate material for the fabrication of thin film transistors including polycrystalline silicon, polymer and organic materials. In particular this embodiment considers appropriate changes for including p-type TFTs that are relevant to persons skilled in the art.

According to another alternative embodiment of the invention the pixel drive circuits do not include the capacitor Cs.

According to another alternative embodiment of the invention the switching circuit 22 is appropriate for the use with a single select line.

According to another alternative embodiment of the invention the transistors of the pixel driver circuits may have more than one gate. In particular the transistors may be dual gate transistors.

According to another alternative embodiment of the invention there is more than one driver circuit for a given pixel. In particular there may be three pixel driver circuits as would be appropriate for pixels in an RGB or colour display.

The present invention has been described with regard to one or more embodiments. However, it will be apparent to persons skilled in the art that a number of variations and modifications can be made without departing from the scope of the invention as defined in the claims.

What is claimed is:

1. A pixel drive circuit for use in a display, the pixel drive circuit comprising:
    switching circuitry for providing a reference current input;
    a current mirror for providing a drive current to a light emitting device based on the reference current, the current mirror including:
        a drive thin film transistor for conveying the drive current through the light emitting device, the drive thin film transistor being connected in series with the light emitting device;
        a reference thin film transistor for receiving the reference current, the reference thin film transistor having a gate connected to a gate of the drive transistor, the reference thin film transistor having a reference node coupled to a biasing potential for balancing the current mirror, wherein a first node of the drive thin film transistor corresponding to the reference node is not connected to the biasing potential, thereby preventing a mismatch between the reference thin film transistor and the drive thin film transistor over time; and
        a capacitor for storing a program voltage independent of a transistor threshold voltage, the program voltage settling on the capacitor while the reference current is conveyed through the reference thin film transistor, the capacitor having a terminal coupled to both the gate of the drive thin film transistor and the gate of the reference thin film transistor.

2. The pixel drive circuit according to claim 1, wherein the light emitting device is a light emitting diode, and wherein the light emitting diode includes a first and a second terminal, the first terminal being connected to the first node of the drive transistor and the second terminal being connected to a first potential.

3. The pixel drive circuit according to claim 1, wherein the switching circuitry comprises:
    a feedback transistor having a gate connected to a first select line, a first node connected to a data line and a second node connected to the reference transistor; and
    a switch transistor having a gate connected to a second select line, a first node connected to the data line and a second node connected to the gate of the reference transistor.

4. The pixel drive circuit according to claim 1, wherein the switching circuitry comprises:
    a switch transistor having a gate connected to a first select line, a first node connected to the data line and a second node connected to the gate of the reference transistor; and
    a feedback transistor having a gate connected to a second select line, a first node connected to the gate of the reference transistor and a second node connected to the reference transistor.

5. The pixel drive circuit according to claim 1, wherein the switching circuitry comprises:
   a switch transistor having a gate connected to a first select line, a first node connected to a data line and a second node connected to the reference transistor;
   a feedback transistor having a gate connected to a second select line, a first node connected to the reference transistor and a second node connected to the gate of the reference transistor.

6. The pixel drive circuit according to claim 1, wherein the thin film transistors are amorphous silicon.

7. The pixel drive circuit according to claim 1, wherein the thin film transistors are polycrystalline silicon.

8. The pixel drive circuit according to claim 7 wherein the polycrystalline silicon is p-type.

9. The pixel drive circuit according to claim 1 wherein the thin film transistors are organic.

10. The pixel drive circuit according to claim 9 wherein the organic thin film transistors are p-type.

11. The pixel drive circuit according to claim 1, wherein the biasing potential is sufficient to maintain the reference transistor in a saturation mode while the driving current is conveyed to the light emitting device and the switching circuitry is deactivated.

12. The pixel drive circuit according to claim 1, wherein the biasing potential is connected to the node of the reference transistor via a switch transistor controlled separately from the switching circuitry, the switch transistor biasing the reference transistor with the biasing potential while the switching circuitry is deactivated.

13. The pixel drive circuit according to claim 1, wherein the biasing potential is different from a potential at a drain terminal or a source terminal of the drive thin film transistor.

14. A pixel drive circuit for use in a display, the pixel drive circuit comprising:
   switching circuitry for providing a reference current input;
   a current mirror for providing a drive current to a light emitting device based on the reference current, the current mirror including:
      a drive thin film transistor for conveying the drive current through the light emitting device, the drive thin film transistor being connected in series with the light emitting device via one of a drain terminal or source terminal of the drive thin film transistor;
      a reference thin film transistor for receiving the reference current, the reference thin film transistor having a gate connected to a gate of the drive transistor, the reference thin film transistor having a node coupled to a biasing potential via one of a source terminal or a drain terminal of the reference thin film transistor, thereby preventing a mismatch between the reference thin film transistor and the drive thin film transistor over time, wherein one of a source terminal or a drain terminal of the drive thin film transistor corresponding to the one of the source terminal or the drain terminal of the reference thin film transistor is not connected to the biasing potential; and
      a capacitor for storing a program voltage independent of a transistor threshold voltage, the program voltage settling on the capacitor while the reference current is conveyed through the reference thin film transistor, the capacitor having a terminal coupled to both the gate of the drive thin film transistor and the gate of the reference thin film transistor.

15. The pixel drive circuit according to claim 14, wherein the light emitting device is connected to the source terminal of the drive thin film transistor and the biasing potential is connected to the source terminal of the reference thin film transistor.

16. The pixel drive circuit according to claim 1, wherein the reference node corresponds to a source terminal of the reference thin film transistor and the first node of the drive thin film transistor corresponds to a source terminal thereof, or wherein the reference node corresponds to a drain terminal of the reference thin film transistor and the first node of the drive thin film transistor corresponds to a drain terminal thereof.

17. The pixel drive circuit according to claim 14, wherein the one of the source terminal or the drain terminal of the reference thin film transistor is the source terminal of the reference thin film transistor, and wherein the one of the source terminal or the drain terminal of the drive thin film transistor is the source terminal of the drive thin film transistor.

18. The pixel drive circuit according to claim 14, wherein the one of the source terminal or the drain terminal of the reference thin film transistor is the drain terminal of the reference thin film transistor, and wherein the one of the source terminal or the drain terminal of the drive thin film transistor is the drain terminal of the drive thin film transistor.

* * * * *